United States Patent [19]
Parker et al.

[11] Patent Number: 5,327,825
[45] Date of Patent: Jul. 12, 1994

[54] SEAMLESS HOLOGRAPHIC TRANSFER

[75] Inventors: Harry A. Parker, Murray Hill; Joseph Allocco, Mendham; John Dixon, Lakehurst, all of N.J.

[73] Assignee: Transfer Print Foils, Inc., East Brunswick, N.J.

[21] Appl. No.: 60,796

[22] Filed: May 12, 1993

[51] Int. Cl.$^5$ ............................................. B31F 1/07
[52] U.S. Cl. ........................................ 101/32; 101/28; 101/401.1; 205/69; 264/219; 264/293; 264/1.3; 264/226
[58] Field of Search ............... 101/401.1, 22, 23, 25, 101/28, 31, 32; 264/1.3, 1.4, 284, 293, 21 C, 220, 226, 227; 425/47, 471, 384, 385, 363, 392, 403; 205/69, 73, 70; 29/890.042; 156/231

[56] References Cited

U.S. PATENT DOCUMENTS

| | | | |
|---|---|---|---|
| 3,048,512 | 8/1962 | Nelson | 101/28 |
| 3,214,310 | 10/1965 | Di Leo et al. | 101/28 |
| 3,619,446 | 11/1971 | Nauta | 101/28 |
| 3,843,763 | 10/1974 | Coll-Palagos | 264/219 |
| 3,957,414 | 5/1976 | Bussey, Jr. et al. | 425/384 |
| 3,966,383 | 6/1976 | Bussey, Jr. et al. | 425/388 |
| 4,478,769 | 10/1984 | Pricone et al. | 264/335 |
| 4,543,299 | 9/1985 | Raley et al. | 428/596 |
| 4,604,156 | 8/1986 | Raley et al. | 156/294 |
| 4,725,111 | 2/1988 | Weitzen et al. | 101/32 |
| 4,906,315 | 3/1990 | McGrew | 156/231 |
| 4,923,572 | 5/1990 | Watkins et al. | 205/69 |
| 4,928,588 | 5/1990 | Mathis | 101/25 |
| 5,003,915 | 4/1991 | D'Amato | 425/122 |
| 5,031,525 | 7/1991 | Kent et al. | 101/32 |
| 5,071,597 | 12/1991 | D'Amato | 264/1.3 |
| 5,110,526 | 5/1992 | Hayashi et al. | 264/323 |
| 5,200,253 | 4/1993 | Yamaguchi et al. | 264/25 |

FOREIGN PATENT DOCUMENTS

| | | | |
|---|---|---|---|
| 3744650 | 7/1989 | Fed. Rep. of Germany | 101/32 |
| 3337961 | 5/1985 | France | 101/28 |

Primary Examiner—Eugene H. Eickholt
Attorney, Agent, or Firm—Plevy & Associates

[57] ABSTRACT

A method of making a die and the die itself for establishing through embossing or micro-embossing a seamless pattern, preferably a holographic pattern, on a decorative medium such as a metallized film is provided. A cylindrical embossing or micro-embossing die is provided with a layer of an embossable material, preferably pure silver, a silver alloy or any other suitable embossable material. The cylindrical die is an integral member in which a pattern is recombined thereon by a step and repeat embossing or micro-embossing process as opposed an intricate lathe-type machine-turning operation, and can thus accept, carry and maintain complex patterns with the integrity required for producing a repeating holographic pattern.

32 Claims, 3 Drawing Sheets

SEAMLESS HOLOGRAPHIC TRANSFER

BACKGROUND OF THE INVENTION

The present invention relates generally to the transfer of images, patterns or designs onto a decorative medium, and more specifically to the transfer of a seamless holographic pattern onto a decorative medium such as, for example, a polyethylene (PET) film or other carrier (before or after metallization), or on a foil or other medium without a carrier. Although not limited thereto, the present invention has particular utility and significance in micro-embossing applications such as, but not limited to, holographic transfers where a surface seems essentially flat, yet contains minute grooves to facilitate the reflection of light. These grooves are typically only about one-quarter of micron in depth and their integrity must be maintained as best as possible on a die in order to effect an adequate transfer onto a decorative medium such as foil. Since groove depth is necessarily limited and often critical, flaws cannot be tolerated in reproduction of holographic patterns. The present invention addresses these needs.

Holographic images, patterns or designs are transferred or micro-embossed onto a web or length of material (for instance, a decorative foil on a carrier web) by a roller which carries on its outer cylindrical surface a shim having the holographic image, pattern or design. Heat and pressure are used to micro-emboss the hologram on the shim from the roller to the web or length of decorative material. This micro-embossing process is conventional. The shim which is wrapped around the roller is established in planar form by a micro-embossing operation by which a small nickel shim (typically 2 inches by 2 inches) which carries the hologram is attached to a stamp, and the hologram is micro-embossed into a planar plastic sheet by a step and repeat process. To facilitate this step and repeat operation, the planar stamping surface is indexed linearly in the X and Y directions across the planar plastic sheet until the micro-embossing is completed on the entire planar surface. The sheet is then sprayed with a silver conductive spray, and subsequently placed in an electro-plating bath to form a durable nickel shim (an electroforming process). This nickel shim is removed from the plastic sheet and is wrapped around a cylinder to form a cylindrical embossing die. In addition to the long and involved process to make the nickel shim, once the nickel shim is wrapped around the cylinder, the ends of the nickel shim form a side-to-side break in the holographic pattern so that the resulting holographic foil includes a production seam made after each revolution of the cylinder. It is also noted that there will also be slight "recombining" seams created by "recombining" the design by the step and repeat process. These recombining seams are usually insignificant since they are either different to see with the naked eye and/or are incorporated into the overall design on the decorative medium. These recombining seams are not eliminated by the present invention.

U.S. Pat. Nos. 4,790,893 and 4,968,370 both relate to the replication of information carriers such as compact discs. The master for replicating the information carriers is a planar nickel shim with patterned or image surface depressions or pits corresponding to audio or video recorded digital information retrievable by, for instance, laser scanning. This planar nickel shim master is wrapped partially around a cylinder and is embossed onto an endless web of a thermoplastic or other material used as the base for the compact disc or other information carrier. This is similar to the above described process in that a planar shim is partially wrapped around a cylinder for embossing onto a web of material. Again, seams will appear in the web of material, but in the replication of information carriers such as compact discs these seams do not form part of the resulting product, and thus do not create a problem as with decorative foil.

U.S. Pat. No. 4,923,572 is directed to a cylindrical embossing tool which can be used for embossing a web of material without leaving seams. Described in this patent is a complex method of making a shim (in the form of a tube or sleeve) which carries an imaged electroform and can be placed over a carrier cylinder by introducing air into the interface of the tubular and floating the tubular shim into position to form a supported embossing tool. In the alternative, the tubular shim carrying the imaged electroform can be supported by a number of rollers to form an endless belt embossing tool. Significantly, however, the electroform embossing tool, whether an endless belt embossing tool or cylindrical embossing tool, is formed by first stamping a polymeric or thermoplastic embossable material layer on a cylinder with a stamper which carries an image or pattern on a concave-shaped stamping surface. A thin layer of metal such as silver could also be deposited prior to embossing the embossable material layer to render it electrically conductive and/or optically reflective. A nickel electroform is then electroformed on the embossable material layer on the cylinder, which nickel electroform carries a negative of the stamped image or pattern. A reinforcement layer in the form of an adhesive, resin or fiberglass particles is then provided to mask the nickel electroform and provide stability and rigidity to the composite layers. These composite layers are then removed from the cylinder, and then the reinforcement together with the nickel electroform are removed from the composite layers. The inside of the hollow cylinder having the nickel electroform is then electroplated to provide another electroform which, by virtue of the negative on the nickel electroform, carries the stamped image or pattern. That second electroform is then removed and either placed over a cylinder or between rollers as described above. The result of this intricate process is a cylindrical embossing tool or a belt embossing tool which can emboss an image or a pattern onto material without leaving seams after each revolution of the cylinder or the belt. However, in addition to the intricacy required to prepare the cylindrical embossing tool or the belt embossing tool, there may be problems with the strength or the durability of the second electroform.

A cylindrical embossing die having a relatively simple pattern burnished into the nickel plating on a steel cylinder has also been used to transfer holograms onto decorative foils in a seamless manner. However, the cylindrical embossing die was produced by an engine-turning operation using an ultra precision machining device which employs, for instance, a single crystal diamond cutting tool in a lathe-type machining process. The operation is intricate and expensive and, more importantly, is limited to extremely simple geometric patterns which can be established by such a lathe-type machining process. The only patterns known to have been established on a nickel plated cylinder by this engine-turning operation is the so-called "laser" pattern which is an extremely simple pattern. Such an operation cannot be used to establish an intricate geometric pattern on a cylinder for use in embossing a seamless pattern on, for instance, metallized PET film.

It is thus apparent that an improved method and die for effecting the seamless transfer of an image, pattern or design onto a material is warranted. Such an improvement should address the cost in manufacturing the apparatus, the durability of the die and the scope of the method in establishing images, patterns or designs for seamless transfer.

SUMMARY OF THE INVENTION

The present invention relates specifically to a method for producing a die which carries a pattern, image or design to be embossed on a decorative medium (or the carrier for a decorative medium) such that the image, pattern or design on the decorative medium includes no production seams. As used herein, the term "decorative medium" shall refer to a decorative material itself (that which ultimately carries the design) or a carrier for a decorative material either before or after the decorative material is applied to the carrier (e.g. PET film or metallized PET film). Of course, those in the industry will recognize that the carrier might be coated with preparatory materials (adhesives, release layers, tying layers, etc.).

The present invention also relates to the die itself which is made by the method, or to a die for micro-embossing a seamless (no production seams) and complex holographic or other pattern onto, for instance, a metallized PET film or other carrier.

The method in accordance with the present invention calls for providing a member having a cylindrical surface which is either already provided with or is coated with a layer of an embossable material, preferably a micro-embossable material. In the preferred embodiment, the layer is silver, and it is plated onto the cylindrical surface. The embossable material should be capable of accepting a pattern in a prepared state and maintaining such pattern in its normal state. In the alternative, the embossable material should be capable of accepting the pattern in its normal state and maintaining such pattern in an altered state. The desirable pattern is imparted into the embossable material layer in order to complete the die. If some curing step is required to ensure the integrity of the pattern in the embossable material layer, this should be done prior to using the die. Of course, where the embossable material layer is heated in preparation for receiving the pattern from, for instance, a stamp in a step and repeat process, the cooling process may be sufficient to secure the pattern in the die. It may also be advantageous to polish the cylindrical surface prior to using the die. Subsequently, a protective or reinforcement layer can be provided in order to render the die and the pattern therein more durable.

Preferably, the die is in the form of a cylinder having a cylindrical surface on which a layer of the micro-embossable material, preferably pure silver, is provided. In the preferred embodiment, the cylinder is prepared (cleaned and etched) to receive the silver layer which is plated onto the cylinder. The pure silver is then heated in preparation for receiving the pattern from a concave-shaped stamping surface which has a radius matching the radius of the cylindrical surface of the cylinder. The stamp carrying the pattern to be imparted into the pure silver layer is also heated in preparation for the micro-embossing operation. Upon micro-embossing the pattern into the pure silver layer on the cylindrical surface of the die, the die or the stamp carrying the pattern must be indexed at least rotationally, and most likely linearly as well. The cylinder can then be cooled and highly polished. A layer of chrome can then be provided to reinforce the micro-embossing surface.

Generally speaking, the die in the preferred embodiment is a cylindrical micro-embossing die which is an integral member. It does not include a shim which is wrapped around or slid over a cylinder. The die is capable of accepting and maintaining the integrity of the minute grooves utilized in preparing holograms or defraction gratings.

Accordingly, it is an object of the present invention to provide a durable embossing die for creating seamless images, patterns or designs on a web of material.

It is another object of the present invention to provide an efficient method for making such an embossing die.

It is yet another object of the present invention to provide a cylindrical embossing die having a complex image, pattern or design on a cylindrical embossing surface.

It is yet another object of the present invention to provide a cylindrical embossing die having an image, pattern or design provided in a pure silver layer for transfer onto a web of material.

It is a further object of the present invention to provide an integral die for micro-embossing a holographic pattern onto a web of material.

The foregoing and other objects can be accomplished by a method (or an article made in accordance with such method) of making a die for embossing a seamless pattern on a web of material including the steps of providing a die foundation having a cylindrical surface with at least a layer of an embossable material which is capable of accepting and maintaining a pattern to be transferred to a web of material, and imparting the pattern into the embossable material layer on the cylindrical surface of the die foundation.

The foregoing and other objects can also be accomplished by providing a die for micro-embossing a seamless and complex holographic pattern onto a web of material where the die includes a cylindrical surface having at least a layer of a micro-embossable material, preferably a pure metal or an alloy metal in which there is recombined a complex holographic pattern around the cylindrical surface.

BRIEF DESCRIPTION OF THE DRAWINGS

The present invention will be better understood by reference to the description below and the accompanying drawings, relating to the preferred embodiment, in which.

DETAILED DESCRIPTION OF THE INVENTION

The preferred embodiment of the present invention is directed to the replication of images, patterns or designs in the form of holograms or defraction gratings onto a web or length of a metallized material, such as a web of metallized PET film. Initially, the holographic image, pattern or design (referred to collectively as "pattern") is preferably provided on a small planar stamping shim, preferably a nickel shim, made by any conventional method. Of course, as explained below, the nickel shim is used on a concave stamping surface as opposed to a planar stamping surface in micro-embossing the cylindrical surface of a cylinder die. The size of the stamping shim may vary; but, because of the great pressure required to micro-emboss the pattern as explained below, the preferred nickel shim is one inch by one inch.

Figure 1:
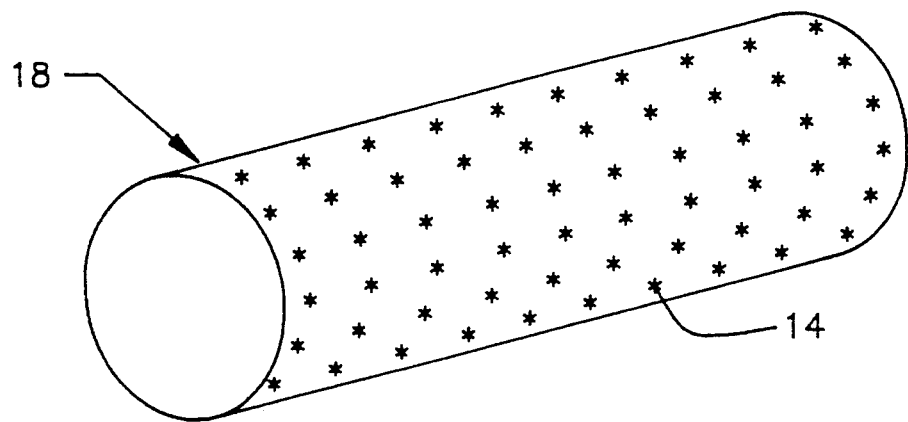
FIG. 1 is a perspective view of a cylindrical integral micro-embossing die.
Figure 3:
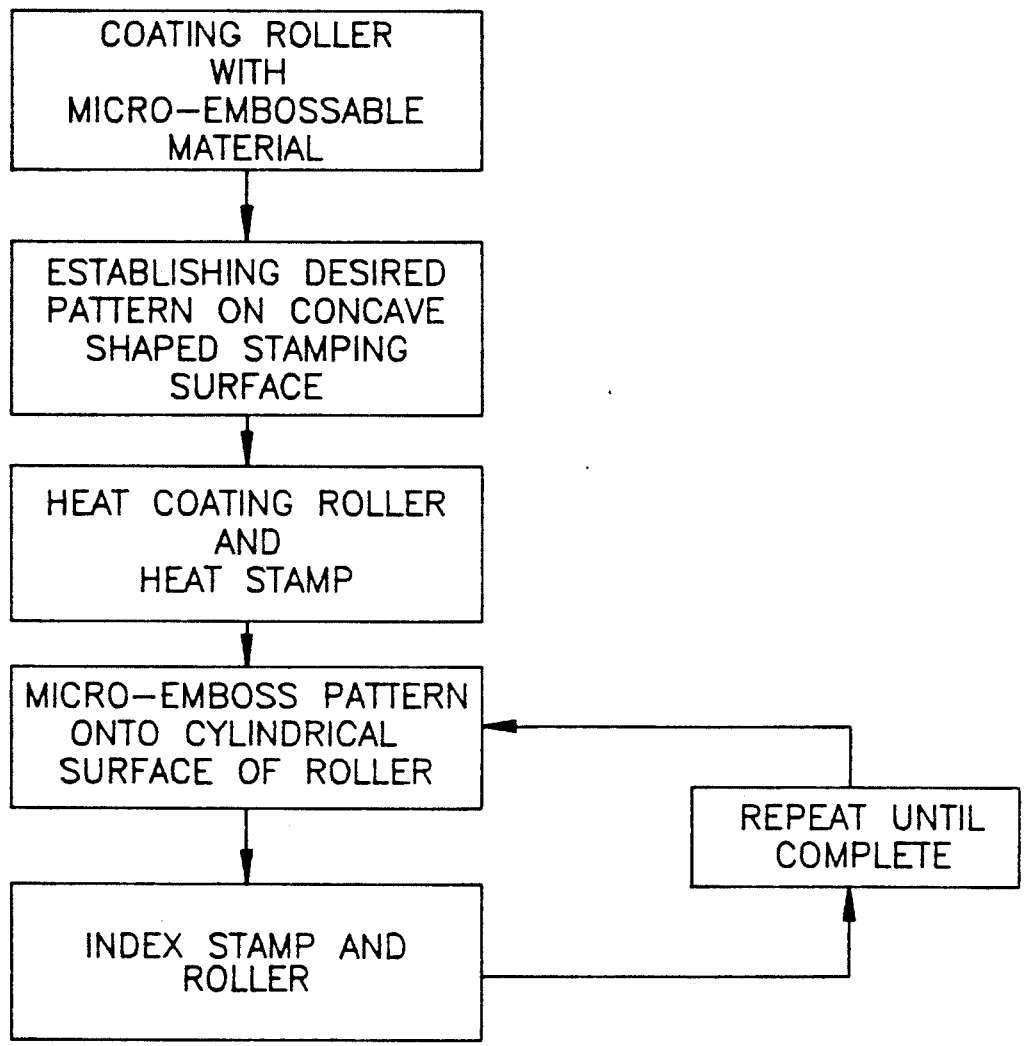
FIG. 3 is a flow chart showing the steps of making a micro-embossing die for micro-embossing a pattern or design onto a web or length of material without a production seam.

A bar or roller 16 (shown as it is being micro-embossed in FIG. 4), preferably made of steel, is provided as the foundation for the cylindrical embossing die 18 (shown as completed in FIG. 1) in accordance with the preferred embodiment. The bar or roller 16 can be of any suitable length or diameter. For instance, to cooperate with some apparatus for embossing a pattern onto twelve (12) inch wide decorative foil, a four (4) inch outer diameter roller which is thirteen (13) inches in length can be provided. The diameter and length of the bar or roller will affect the indexing steps when "recombining" the pattern with the stamping shim on the cylindrical surface in the step and repeat operation discussed below. It is also noted that although a steel cylinder is used in the preferred embodiment, any suitable material can be used for this purpose, even a non-metal.

The bar or roller is coated, after suitable preparation if necessary, with an embossable or, preferably, a micro-embossable material. In the preferred embodiment, the micro-embossable material is a pure silver which is plated, by a known plating method, onto the cylinder after the cylinder is cleaned and etched (for better retention of the silver). It is also expected that pure gold or other precious metals (or gold or silver alloys) might very well be suitable for use in the present invention. The criteria for the micro-embossable material is that the impression of the pattern from the stamp shim (or other expedient for imparting the pattern on the cylindrical surface of the roller) be picked up relatively clearly so that a similarly clear impression will be embossed onto the web of material (typically a metallized PET film). By way of example, the preferred embodiment relates to a hologram whereby there are, in essence, minute grooves which form the desired pattern. A replica of these grooves should be, in most cases, crisply defined in the micro-embossable material which coats the cylindrical surface of the roller so that a similarly crisply defined replica of the desired pattern appears on the metallized film. Of course, the desired degree of quality varies from application to application, and therefore some applications may not require such a high degree of definition.

For purposes of micro-embossing a hologram or defractive grating on a foil, certain pure metals do not seem to work very well since a relatively clear impression of the desired pattern was not accepted and maintained on the cylindrical surface of the roller as coated by such pure metals (although these materials might be usable in other applications). For instance, pure chrome, pure copper and pure nickel seemed too hard under the test circumstances, while pure lead and pure tin seemed to be too soft under the test circumstances. In addition, brass, aluminum and zinc, all in their pure form, also did not seem to adequately accept the desired pattern from the nickel stamping shim. Of course, experimentation with alloys of the above-mentioned metals, or with any other materials, and/or different circumstances in imparting the desired pattern onto the coated roller may prove suitable for use in accordance with the present invention. Further, in addition to metals, any other micro-embossable material suitable for use in connection with the present invention can be used as the embossable or micro-embossable material.

Still further with respect to coating the roller with a micro-embossable material, it should be understood that the step of coating the roller may not be necessary should the roller be made entirely of a micro-embossable material. However, it is more likely that the roller will be of a different material than the desirable micro-embossable material, particularly where pure silver or another precious metal serves as the micro-embossable material of choice since it would not be cost effective to make the entire roller from such a precious metal.

Figure 2:
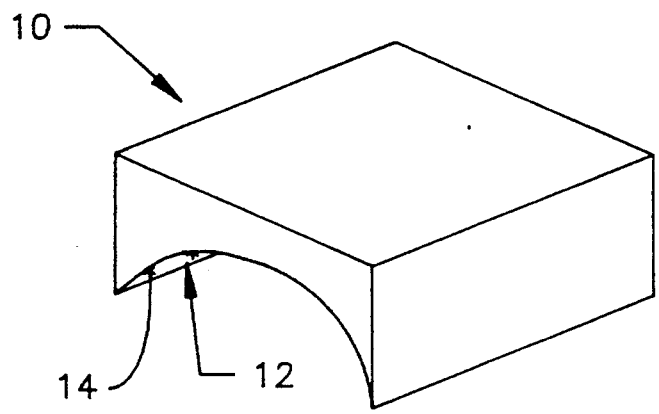
FIG. 2 is a perspective view of a stamp having a concave-shaped stamping surface on which an image, pattern or design (shown as asterisks for illustration only) is carried for micro-embossing onto a cylindrical surface.

A stamp 10, as shown in FIG. 2, is also provided for practicing the method in accordance with the present invention. The stamp 10 has a concave-shaped stamping surface 12 and is preferably made of steel, although any suitable material or materials can be used. The radius of the concave-shaped stamping surface should match the radius of the cylindrical surface of the silver-coated roller. The desired pattern 14 is then established on the concave stamping surface 12 by any suitable means. One way in which to establish the desired pattern on the concave stamping surface 12 is to use the small planar nickel stamping shim as discussed above. The planar nickel stamping shim will be formed into the stamp 10 so that it conforms to the concave-shaped stamping surface 12. Of course, the desired holographic pattern 14 could be established on the concave-shaped stamping surface 12 in any other suitable manner consistent with the use of the stamp 10 on the cylindrical surface of the silver coated roller.

The silver coated roller, which is an integral member, is then heated, preferably from the inside out, until the pure silver coating is in the range of 240° F. to 300° F. It is noted that with pure silver, if the temperature is below 240° F., the pure silver does not pick up the desired pattern 14 as discussed below since it has not been softened enough; and if the pure silver is heated to more than 300° F., it does not pick up the desired holographic pattern 14 because it flows too much (i.e., becomes molten).

The degree to which the micro-embossable material in the roller or coated on the roller is heated will depend upon the material itself. Some micro-embossable materials might not require heating at all; rather requiring some other preparation for receiving the desired holographic pattern 14 (or to cure the surface after it has been micro-embossed). For instance, a component part of a resin or other micro-embossable material might be utilized to prepare the cylindrical surface of the roller for receiving the desired holographic pattern 14 (or to cure the surface after it has been micro-embossed). The prepared and embossed micro-embossable material must be curable in some manner since the ultimate use of the roller with the pattern thereon will be subject to heat and pressure (to micro-emboss the pattern onto web of metallized PET film).

The stamp 10 is also heated in preparation for the micro-embossing operation. In the preferred embodiment, the stamp 10 is heated to at least 450° F. The temperature to which the stamp 10 is raised may also change depending upon how the pattern is carried on the concave or other stamping surface, as well as on the type of micro-embossable material used.

The stamp 10 is then brought into contact with a portion of the cylindrical surface of the coated roller in order to emboss by pressure the desired holographic pattern 14 on the concave-shaped stamping surface 12 onto the cylindrical surface of the heated roller. In the preferred embodiment, thirty (30) tons of pressure are applied to adequately emboss the pattern into the pure silver layer on the roller. Again, the amount of pressure, although typically always large, depends upon other parameters such as the temperature of the stamp 10, the temperature of the pure silver or other layer of micro-embossable material, the type of micro-embossable layer, and the manner in which the holographic pattern 14 is established on the stamp 10.

Figure 4:
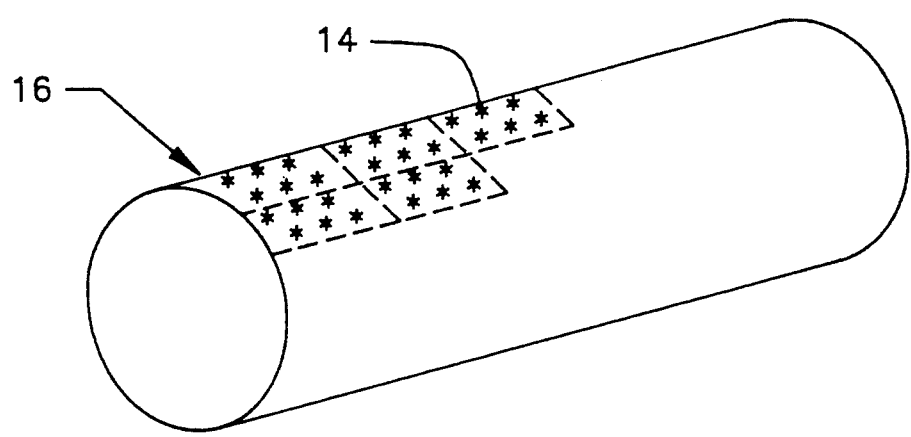
FIG. 4 is a perspective view of a partially embossed roller to illustrate the requisite rotational and linear indexing, the phantom lines showing the areas stamped by the small concave stamping surface.

Because the concave stamping surface 12 of the stamp 10 only covers a portion of the cylindrical surface, the coated roller must be indexed at least rotationally so that all portions of the cylindrical surface can be micro-embossed with the holographic pattern 14 (if embossing of the entire surface is required). In the preferred embodiment, the stamp is only one inch by one inch, and therefore the stamp and the roller must be indexed rotationally and linearly to micro-emboss the holographic pattern 14, by a step and repeat process, onto the cylindrical surface of the coated roller. A partially embossed roller is shown in FIG. 4, the phantom lines being shown only to show areas stamped by the stamp 10 (though recombining seams will typically appear where the phantom lines are provided). The requisite indexing can be done in any suitable manner, that is, moving either or both the stamp 10 and the coated roller. In the preferred embodiment, the roller is indexed both rotationally and linearly. It is important, however, that the indexing be precise so that there is no discernable interruption (in the form of imperfections or space) in the resulting repeat pattern on the roller. Of course, the rotational and linear indexing and micro-embossing is continued until the entire cylindrical surface, or the desirable portion of the cylindrical surface, is covered.

The use of the stamp 10 in recombining the desired holographic pattern into the pure silver layer is presently the preferred method. However, there are other methods which can be used to recombine a pattern into a micro-embossable material on the cylinder to accomplish the purposes and objectives of the present invention. For example, it might be possible under certain circumstances and for certain applications to establish a pattern on the planar surface of a flat bar, and the coated roller and the planar surface of the bar can be moved relative to one another to emboss or micro-emboss the pattern into the micro-embossable material so that the result is the same—a cylinder with the desired pattern therearound for use in producing seamless repeating patterns on a web of material. Further, the present invention need not be limited to micro-embossing with pressure as disclosed since the concepts underlying the present invention can be practiced by any suitable method of imparting a pattern, other than machine-turning simple patterns, onto a roller for use in producing a seamless product.

After the micro-embossing of the cylindrical surface is complete (in its entirety or partially, as desired), the roller or micro-embossed layer is allowed to cool or otherwise set. In the preferred embodiment, the micro-embossed silver layer is highly polished. It might also be desirable to coat the micro-embossed roller with a protective or reinforcement layer such as chrome which would add to the durability of the micro-embossed pattern and thereby help maintain the integrity of the pattern. The resulting cylindrical embossing die 18 can then be arranged for use in conventional embossing apparatus for micro-embossing the holographic design onto foil.

Thus, while the foregoing description and figures illustrate one preferred embodiment of the method and article in accordance with the present invention, it should be appreciated that certain modifications could be made and are encouraged to made in the materials and techniques of the disclosed embodiment without departing from the spirit and scope of the present invention which is intended to be captured by the claims set forth immediately below.

We claim:

1. A method of making a die for embossing a seamless pattern onto a web of material, said method comprising the steps of:
   providing a die having a curved outer surface;
   coating said curved outer surface of said die with at least one layer of embossable material;
   mounting a stamping shim to a concave-shaped stamping surface of a stamp, said stamping shim conforming to said concave-shaped stamping surface of said stamp and presenting an embossing pattern; and
   impressing said embossing pattern of said stamping shim against a portion of said at least one layer of embossable material to form an embossment therein.

2. The method according to claim 1, further comprising the step of heating said stamp and said die prior to said step of impressing.

3. The method according to claim 2, wherein said step of heating includes heating said die until said at least one layer of embossable material is sufficiently softened so that the resolution of said embossment is capable of micro-embossing the web of material.

4. The method according to claim 3, wherein said die is heated form an inside thereof.

5. The method according to claim 2, further comprising the step of indexing said stamp and said die in order to form embossments on remaining portions of said at least one layer of embossable material.

6. The method according to claim 1, wherein said coating step includes plating.

7. The method according to claim 6, wherein said at least one layer of embossable material is a pure metal.

8. The method according to claim 6, wherein said at least one layer of embossable material is an alloy.

9. The method according to claim 7, wherein said pure metal is pure silver, and further comprising the step of heating said die so that said at least one layer of embossable material is within a range of 240° to 300° F.

10. The method according to claim 1, wherein said die is substantially cylindrical in shape.

11. The method according to claim 10, further comprising the step of indexing said stamp and said die linearly and rotationally in order to form embossments on remaining portions of said at least one layer of embossable material.

12. The method according to claim 1, wherein said embossment formed in said at least one layer of embossable material is a holographic pattern.

13. The method according to claim 1, wherein said embossment formed in said at least one layer of embossable material defines at least in part, minute grooves.

14. The method according to claim 1, wherein said die and said stamp are made from steel.

15. The method according to claim 1, wherein said die is made from a non-metal.

16. The method according to claim 1, wherein said step of impressing takes place at a pressure sufficient to form said embossment in said at least one layer of embossable material.

17. The method according to claim 16, wherein said pressure is 30 tons.

18. The method according to claim 1, further comprising the step of applying a protective layer over said embossment.

19. The method according to claim 5, further comprising the step of applying a protective layer over said embossments.

20. The method according to claim 11, further comprising the step of applying a protective layer over said embossments.

21. The method according to claim 1, further comprising the step of indexing said stamp and said die in order to form embossments on remaining portions of said at least one layer of embossable material.

22. The method according to claim 21, further comprising th step of applying a protective layer over said embossments.

23. A method of making a die for embossing a seamless pattern onto a web of material, said method comprising the steps of:

providing a die having a curved outer surface, said curved outer surface of said die being embossable;

mounting a stamping shim to a concave-shaped stamping surface of a stamp, said stamping shim conforming to said concave-shaped stamping surface of said stamp and presenting an embossing pattern; and impressing said embossing pattern of said stamping shim against a portion of said curved outer surface of said die to form an embossment therein.

24. The method according to claim 23, further comprising the step of indexing said stamp and said die in order to form embossments on remaining portions of said curved outer surface.

25. The method according to claim 23, wherein said die is substantially cylindrically shaped.

26. The method according to claim 25, further comprising the step of indexing said stamp and said die linearly and rotationally in order to form embossments on remaining portions of said curved outer surface.

27. The method according to claim 23, wherein said embossment formed in said curved outer surface is a holographic pattern.

28. The method according to claim 23, wherein said embossment formed in said curved outer surface defines at least in part, minute grooves.

29. The method according to claim 23, wherein said step of impressing takes place at a pressure sufficient to form said embossment in said curved outer surface of said die.

30. The method according to claim 23, further comprising the step of applying a protective layer over said embossment.

31. The method according to claim 24, further comprising the step of applying a protective layer over said embossments.

32. The method according to claim 26, further comprising the step of applying a protective layer over said embossments.

* * * * *